Aug. 15, 1961 J. N. BARRY ET AL 2,996,680
TRANSISTORIZED PULSE DEMODULATOR
Filed April 28, 1959 3 Sheets-Sheet 1

INVENTORS
JOHN NORMAN BARRY
SIDNEY FREDERICK FISHER
BY Kirschstein, Kirschstein & Ottinger
ATTORNEYS

TRANSISTORIZED PULSE DEMODULATOR

Filed April 28, 1959 3 Sheets-Sheet 2

INVENTORS
JOHN NORMAN BARRY
SIDNEY FREDERICK FISHER
BY
Kirschstein, Kirschstein & Ottinger
ATTORNEYS INVENTORS
JOHN NORMAN BARRY
SIDNEY FREDERICK FISHER
BY Kirschstein, Kirschstein & Ottinger
ATTORNEYS United States Patent Office 2,996,680

Patented Aug. 15, 1961

2,996,680

TRANSISTORIZED PULSE DEMODULATOR

John Norman Barry, Edgware, and Sidney Frederick Fisher, Flackwell Heath, England, assignors to The General Electric Company Limited, London, England Filed Apr. 28, 1959, Ser. No. 809,403
Claims priority, application Great Britain May 1, 1958
11 Claims. (Cl. 329—102)

This invention relates to electric circuits including transistors.

The present invention is particularly, though not exclusively, concerned with electric circuits including transistors for use in pulse communication systems.

According to the present invention, in an electric circuit including a transistor having a base electrode, an emitter electrode, and a collector electrode, an inductance shunts capacitance in the base-to-emitter circuit of the transistor, the arrangement being such that energy of a pulse applied to the base electrode to bias the transistor beyond cut-off is stored in said capacitance and the resulting discharge of this capacitance into the inductance after the cessation of this pulse causes the transistor to become conducting whereby collector current then flow continuously as a result of the pulse for a period which is substantially longer than the duration of that pulse.

A circuit according to the present invention may find application in a pulse detector for providing a continuous output signal for as long as a pulse train is applied to that detector. In addition that circuit may find application in a demodulator for demodulating a train of amplitude modulated pulses such as used in a time division multiplex communication system.

One embodiment of a transistor circuit in accordance with the present invention, together with applications of that circuit, will now be described, by way of example, with reference to the accompanying drawings in which.

Figures 1, 2:
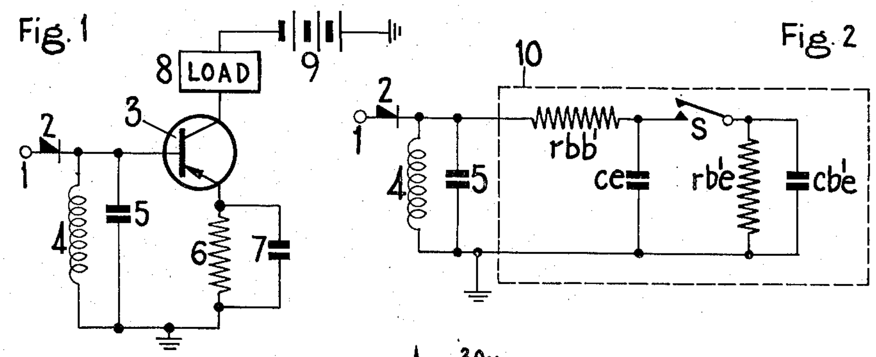
FIGURE 1 shows the transistor circuit.
FIGURE 2 shows part of the circuit of FIGURE 1, the transistor being represented in this figure by its equivalent circuit.

Referring to FIGURE 1, an input terminal 1 of the circuit is connected through a crystal diode 2 to the base electrode of a P-N-P junction transistor 3. The terminal 1 is normally maintained substantially at earth potential. An inductor 4 and a capacitor 5 are connected in parallel between the base electrode of the transistor 3 and earth.

The emitter electrode of the transistor 3 is connected to earth through a negative feedback resistor 6 which is by-passed by a capacitor 7. The collector electrode of the transistor 3 is connected through a load 8 to the negative pole of a battery 9, the positive pole of this battery 9 being connected directly to earth. The nature of the load 8 is described later but it will be assumed for the present to be purely resistive.

In operation a pulse which is positive-going with respect to earth is applied to the input terminal 1 every one hundred microseconds. Each such pulse has a duration of half a microsecond and causes the diode 2, which is normally substantially non-conducting, to become conducting for the duration of that pulse and thereby to apply that pulse to the base electrode of the transistor 3.

The transistor 3 is so arranged that before any pulse is applied to the base electrode of that transistor, any emitter current flowing in the circuit is of negligibly small magnitude. The application of the positive-going pulse to the base electrode biasses the transistor 3 beyond cut-off for the duration of that pulse. Due to the inductor 4 and capacitor 5 the transistor 3 then rapidly becomes conducting and remains in this condition for a period which is long compared with the duration of the applied pulse. At the end of this period the transistor 3 returns to its normal condition to await the application of the next pulse to the input terminal 1. There is a tendency for oscillation to occur in the circuit after the period of full conduction, but any such oscillation may be damped as explained later.

The duration of the period for which the transistor 3 conducts as a result of each pulse may be for example, within the range of ten to sixty microseconds. This duration may even be such that after each pulse the transistor 3 remains in that conducting condition until the next pulse is applied to the terminal 1, that is, for a period substantially equal to one hundred microseconds.

The action of the inductor 4 and the capacitor 5 upon the transistor 3 in the circuit shown in FIGURE 1 will be explained with reference to FIGURE 2. In FIGURE 2, the equivalent circuit of the transistor 3 effectively connected across the inductor 4 and the capacitor 5 is shown within broken lines 10, the terminal 1, the diode 2 and the inductor 4 together with the capacitor 5, being connected as in the circuit of FIGURE 1. The resistor 6 and the capacitor 7 connected in the emitter circuit of the transistor 3, are omitted from FIGURE 2, for clarity, the basic operation of the circuit being clear without them.

Referring to FIGURE 2, the equivalent circuit (10) of the transistor 3 includes a resistor *rbb'* constituting the extrinsic base resistance (that is, the base terminal-to-base resistance) of the transistor 3. The resistor *rbb'* is connected in series with a capacitor *ce* to shunt the inductor 4 and the capacitor 5. The capacitor *ce* constitutes the effective base-to-emitter junction capacitance of the transistor 3 in the absence of emitter current.

The junction of the resistor *rbb'* and the capacitor *ce* is connected to earth through a switch S and a resistor *rb'e*, the resistor *rb'e* being shunted by a capacitor *cb'e*. The resistor *rb'e* and the capacitor *cb'e* constitute respectively the base-to-emitter resistance and the base-to-emitter diffusion capacitance which are effective with the flow of emitter current in the transistor 3.

In the following description of the operation of the circuit reference is made to the waveforms shown at (*a*), (*b*) and (*c*) of FIGURE 3. Of these waveforms that shown at (*a*) is the pulse waveform applied to the input terminal 1, whereas those shown at (*b*) and (*c*) are the resulting waveforms which appear at the base and collector electrodes respectively of the transistor 3.

With the normal biassing of the emitter-to-base current path the switch S effectively remains open. In addition while no pulse is applied to the input terminal 1 the diode 2 is biassed to present a high impedance between the terminal 1 and the transistor 3.

Figure 3:
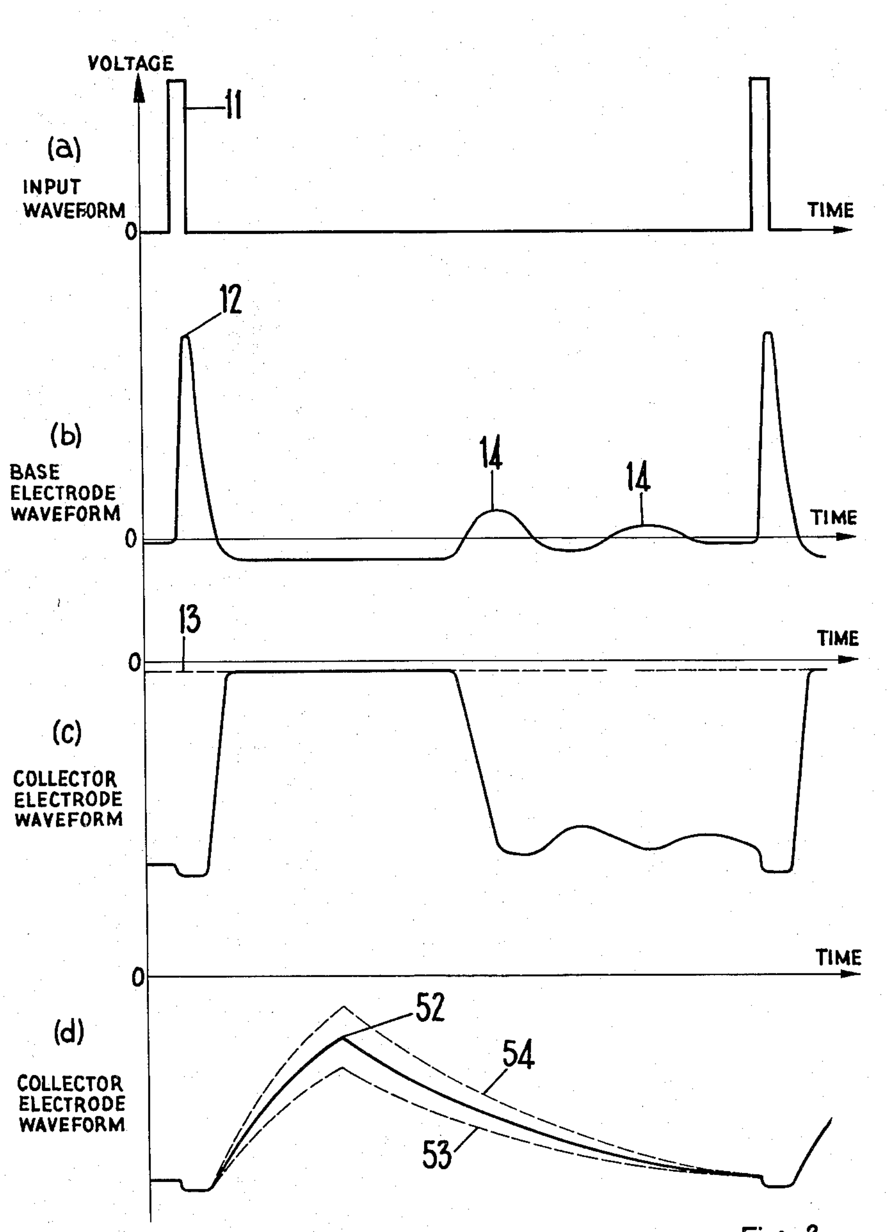
FIGURE 3 shows, at (*a*) to (*d*), waveforms to which references are made by way of explanation of the operation of the circuit of FIGURE 1.

The application of a positive-going pulse, such as represented by the pulse 11 at (*a*) in FIGURE 3, to the input terminal 1 causes substantial current to flow through the diode 2 for the duration of that pulse. The value of the inductor 4 is such that while the pulse 11 is being applied to the input terminal 1 substantially no current flows through that inductor so that the capacitor 5 and the capacitor *ce* both charge. The voltage applied to the base electrode of the transistor 3 as a result rises rapidly to a peak 12 represented at (*b*) in FIGURE 3. The resistor *rbb'* does not appreciably affect the charging of the capacitor *ce* owing to its relatively low value of resistance.

At the end of the duration of the pulse 11 the diode 2 is biassed in its reverse direction by the charge on the capacitors 5 and *ce*. The capacitors 5 and *ce* now discharge through the inductor 4. Since the diode 2 is biassed in its reverse direction this discharge tends to be oscillatory, but as soon as the potential at the base electrode has fallen to just below that of earth the transistor 3 conducts. This change in conducting condition of the transistor 3 is represented by closure of the switch S.

Just prior to the instant when the switch S is to be considered as closed, the current which flows in the oscillatory circuit formed by the inductor 4 and the capacitors 5 and *ce*, is substantially a maximum, the energy of this oscillatory circuit then residing almost completely in the inductor 4. When the switch S does close therefore, substantially the whole of the energy stored as a result of the pulse 11 is applied to be amplified by the transistor 3. As a result the collector electrode current of the transistor 3 rises rapidly from zero to the maximum possible for the circuit, so that the transistor 3 "bottoms." The time interval between the end of the input pulse and the subsequent commencement of collector current is only a few microseconds, and is of course dependent upon the inductance of the inductor 4.

The "bottomed" state of the transistor 3 is indicated by the voltage level 13 at (*c*) in FIGURE 3, and the transistor 3 remains in this condition until the energy stored in the inductor 4 has been almost completely dissipated. This period is substantially longer than the duration of the pulse 11, and is dependent upon the energy of the pulse as originally stored by the capacitors 5 and *ce*.

Figure 6:
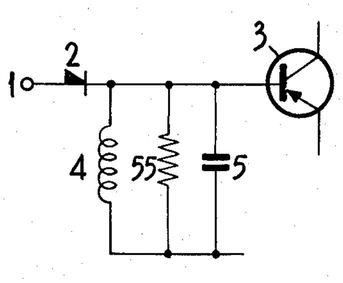
FIGURE 6 illustrates a modification of the circuit shown in FIGURE 1.

The rise in the voltage applied to the base electrode of the transistor 3 which is consequent upon the dissipation of the energy stored in the inductor 4, causes the collector current to return to its normal value. Since there is still some residual energy in the oscillatory circuit formed by the inductor 4 and the capacitors 5 and *ce*, there is a tendency for this circuit to oscillate slightly as represented by the oscillations 14 at (*b*) in FIGURE 3. The circuit of FIGURE 1 may be modified, as illustrated in FIGURE 6, to dampen any such oscillation. In this modification a resistor 55 is connected in shunt with the inductor 4.

In certain circumstances it may be found that the base-to-emitter capacitance represented in FIGURE 2 by the capacitor *ce*, is of sufficient magnitude to allow the capacitor 5 to be dispensed with. For example in a case where the duration of the input pulse is very short this capacitance alone may be capable of storing substantially all the energy of that pulse. The basic mode of operation of the circuit as described above is of course unaffected in such a case.

The mode of operation of the circuit shown in FIGURE 1 has been described with reference to FIGURE 3 assuming that the load 8 is purely resistive, however it will be appreciated that the general principles of operation apply in cases where the load 8 is not purely resistive. The nature of the load will of course in general depend upon the particular application of the circuit.

One application of the transistor circuit described above with reference to FIGURE 1 is in a pulse detector for providing a direct current output signal for as long as a train of pulses is being applied to that detector. Such a detector is required for example, in the line circuit of a subscriber connected to an automatic telephone exchange of the kind in which signals are transmitted over pulse communication channels which are combined in time division multiplex. The presence of the output direct current in these circumstances indicates that a train of pulses in one of the pulse communication channels is being received by that line circuit. The direct current may be used in that line circuit for example, to hold a relay energised for the duration of the reception of those pulses, this relay applying ringing or other calling signals to the subscriber's line. The circuit of the pulse detector will now be described with reference to FIGURE 4, the same reference numerals being used in this figure as in FIGURE 1 to indicate corresponding circuit components.

Figure 4:
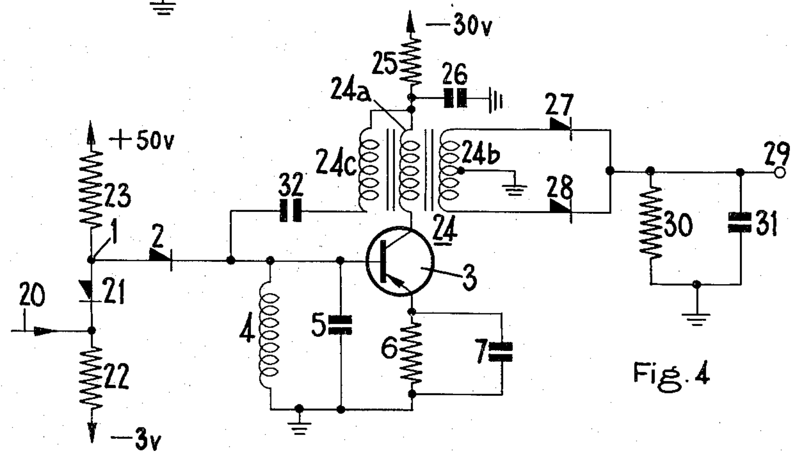
FIGURE 4 shows a pulse detector including the circuit of FIGURE 1.

Referring to FIGURE 4, positive-going pulses received by the subscriber's line circuit from a lead 20 are applied to the input terminal 1 through an input circuit which includes a diode 21 connected between the lead 20 and the terminal 1. The junction of the lead 20 and the diode 21 is connected to one end of a resistor 22 the other end of which is maintained at a potential of −3 volts with respect to earth. A resistor 23 is connected at one end to the terminal 1, the other end of this resistor 23 being maintained at a potential of +50 volts with respect to earth.

The load connected to the collector electrode of the transistor 3 is constituted in this case by a transformer 24 and a resistor 25, a primary winding **24*a* of the transformer 24 being connected in series with the resistor 25 in the collector electrode circuit. The end of the resistor 25 which is remote from the primary winding 24*a* is maintained at −30 volts with respect to earth. A decoupling capacitor 26 is connected between earth and the junction of the primary winding 24*a* and the resistor 25**.

The transformer 24 has two secondary windings **24*b* and 24*c*, the winding 24*b* having a centre tap which is connected directly to earth. The two ends of the secondary winding 24*b* are connected to like poles of respective diodes 27 and 28. The other like poles of these diodes 27 and 28 are connected to an output terminal 29. Smoothing of the rectified output applied to the terminal 29 is provided by a resistor 30 and capacitor 31** connected in parallel to earth.

The secondary winding **24*c* of the transformer 24 is connected as part of a neutralising circuit in which one end of the winding 24*c* is connected through a capacitor 32 to the base electrode of the transistor 3. The other end of the winding 24*c* is connected to the junction between the primary winding 24*a* and the resistor 25. The winding 24*c* is wound in the same sense, and with the same number of turns, as the primary winding 24*a*, the winding 24*c* being in fact constituted in the present case by one half of a bifilar winding the other half of which constitutes the primary winding 24*a***.

In operation each pulse applied from the lead 20 to the diode 21 biasses this diode, which is normally conducting, to cease conducting for the duration of that pulse. In this manner, a positive-going pulse is applied to the input terminal 1 of the transistor circuit for the application of each pulse over the lead 20. The amplitude of the pulse applied to this input terminal 1 is substantially independent of the amplitude of the pulse applied over the lead 20.

In the present case the pulses in the communication channels each have a period of half a microsecond, the recurrence period of the train of pulses being one hundred microseconds. A half microsecond pulse is therefore applied to the input terminal 1 every one hundred microseconds while channel pulses are received by the subscriber's line circuit. As described above in relation to FIGURE 1, the application of any such pulse to the transistor 3 and the associated inductor 4 and capacitors 5 and *ce*, results in the flow of maximum collector current for a period substantially longer than half a microsecond. In this case it is arranged that the duration of this period is about fifty microseconds, that is, half the pulse recurrence period of the channel pulses. The duration of this period may be varied slightly by varying the magnitude of the resistor 6 connected to the emitter electrode of the transistor 3.

The resulting voltage signal which appears across the secondary winding 24b is a square wave which is rectified by the diodes 27 and 28 to provide at the output terminal 29 a substantially smooth direct current signal of approximately 10 milliamps.

The output signal may be applied to energise, possibly after amplification, a relay (not shown) in the subscriber's line circuit for the purpose previously described.

The neutralising circuit between the collector electrode circuit and the base electrode circuit of the transistor 3 neutralises any undesired tendency for oscillation of the transistor circuit.

Another application of the transistor circuit described above with reference to FIGURE 1 is also to be found in a subscriber's line circuit. In this case however, the transistor circuit is used to demodulate the channel pulses received by that line circuit, these channel pulses being amplitude modulated by the speech signal which is to be received by the subscriber connected to that line circuit. This pulse demodulator will now be described with reference to FIGURE 5, and as before, the same reference numerals are used in this figure as are used in FIGURE 1 to indicate corresponding circuit components.

Figure 5:
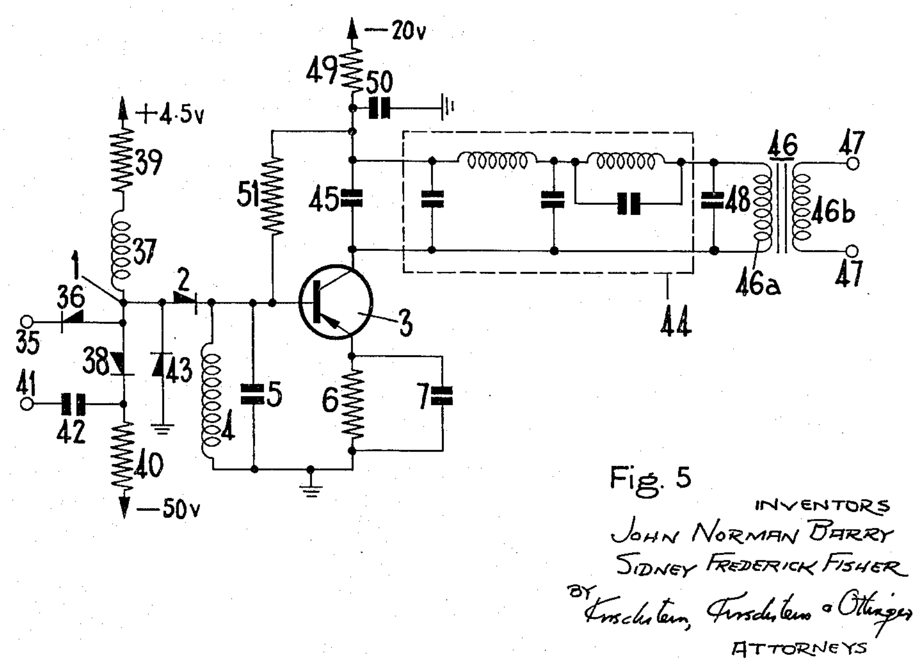
FIGURE 5 shows a demodulator including the circuit of FIGURE 1.

Referring to FIGURE 5, a terminal 35 to which the amplitude modulated channel pulses are applied in operation, is connected through a diode 36 to the input terminal 1. The terminal 1 is in addition connected to the junction of an inductor 37 and a diode 38, the inductor 37 being connected in series with a resistor 39, and the diode 38 being connected in series with a resistor 40. The end of the resistor 39 remote from the inductor 37 is maintained at a potential of +4.5 volts with respect to earth, whereas the end of the resistor 40 remote from the diode 38 is maintained at a potential of −50 volts with respect to earth.

A terminal 41 is connected through a capacitor 42 to the junction of the diode 38 and the resistor 40. Gating pulses in the time positions of the channel pulses which the demodulator is to receive are applied in operation to the terminal 41.

A diode 43 is connected between the terminal 1 and earth in order to ensure that the potential of the terminal 1 does not fall substantially below earth potential at any time during operation.

The load connected in the collector electrode circuit of the transistor 3 includes a low-pass filter 44 which has a cut-off frequency of approximately 5 kilocycles per second. The filter 44 is coupled, in parallel with a capacitor 45, to the collector electrode of the transistor 3, and is terminated by a primary winding 46a of a transformer 46.

The transformer 46 has a secondary winding 46b connected to a pair of output terminals 47. The transformer 46 may be formed by part of a hybrid transformer connected to the subscriber's line in the telephone exchange. In these circumstances the pair of output terminals 47 are connected directly to the subscriber's line and the windings 46a and 46b are respectively constituted by the appropriate speech-output and line windings of the hybrid transformer.

A capacitor 48 is connected in parallel with the winding 46a, the two capacitors 45 and 48 improving the frequency-response characteristic of the filter 44.

The collector electrode load of the transistor 3 also includes a resistor 49, one end of this resistor 49 being maintained at a potential of −20 volts with respect to earth. The junction of the resistor 49 and the filter 44 is decoupled by a capacitor 50.

A resistor 51 is connected between the base electrode of the transistor 3 and the junction of the resistor 49 and the filter 44. This resistor 51 acts to provide a damping resistance shunting the inductor 4.

In operation amplitude modulated channel pulses of all the speech communication channels in use in the telephone exchange are applied over a common multiplex communication highway to the input terminal 35. These pulses are correspondingly applied to the input terminals such as the terminal 35, of the demodulators of all the other subscribers connected to the exchange.

While no gating pulses are applied to the terminal 41 the potential of the terminal 1 is maintained at substantially that of earth by the flow of current through the series circuit including the resistor 39, the inductor 37, the diode 38 and the resistor 40. The channel pulses applied to the terminal 35 are positive-going with respect to earth so that in these circumstances none of those pulses are applied to the terminal 1.

When it is desired that the subscriber connected to the output terminals 47 shall receive signals transmitted in one of the communication channels, a train of gating pulses in the time positions of that channel are applied to the terminal 41. These gating pulses are positive-going so that for the duration of each gating pulse the diode 38 is biased in the reverse direction. As a result, the amplitude modulated pulses in the desired channel appear at the terminal 1.

The filter 44 has a capacitive input impedance at the pulse repetition frequency of 10 kilocycles per second, so that in these circumstances the collector electrode waveform is substantially as shown at (*d*) of FIGURE 3, the transistor 3 acting substantially as a constant current source. In response to each input pulse the collector electrode potential rises to a peak 52 as the pulse energy stored in the inductor 4 is discharged into the transistor 3. The potential of the collector electrode then falls and preferably reaches its normal value again just before the next input pulse appears at the terminal 1.

The energy stored in the inductor 4 due to each pulse depends upon the amplitude, and therefore the modulation, of that pulse. Thus the peak, such as the peak 52, to which the collector electrode potential rises is determined by the modulation of that pulse, but the time to reach the peak is substantially constant.

The collector electrode waveforms for input pulses of minimum and maximum modulated amplitude are shown by the broken lines 53 and 54 respectively, at (*d*) in FIGURE 3. The variation in the peak of the collector electrode waveform for variation in the modulation of the input pulses is substantially linear between the waveforms represented by the broken lines 53 and 54. As a result the required speech signals which modulate the received channel pulses are applied by the filter 44 to the transformer 46 thence to appear across the pair of output terminals 47.

It will be appreciated of course that in order to avoid distortion, the transistor 3 should not in this case "bottom" in response to any pulse applied to the terminal 1.

In one demodulator constructed as described above with reference to FIGURE 5, the transistor 3 is of the type GET104 supplied by The General Electric Company Limited, the base-to-emitter capacitance (represented by the capacitor *ce* in FIGURE 2) for this transistor being of the order of 20 picofarads when the base electrode is biased 6 volts positive with respect to the emitter electrode. The inductance of the inductor 4 is 23 millihenries, and that of the inductor 37 is 2 millihenries. The values of the resistors and capacitors are as follows:

| | | |
|---|---|---|
| Resistors: | | |
| **6** | ohms | 72 |
| **39** | do | 820 |
| **40** | kilohms | 6.8 |
| **49** | do | 1 |
| **51** | do | 27 |
| Capacitors: | | |
| **5** | picofarads | 133 |
| **7** | microfarads | 100 |
| **42** | do | 0.1 |
| **45** | do | 0.01 |
| **48** | do | 0.01 |
| **50** | do | 2 |

The diode 2 is of the type OA7 supplied by Mullard Limited, whereas the diodes 36, 38 and 43 are each of the type GEX54 supplied by The General Electric Company Limited.

The input channel pulses to this circuit have a mean pulse height of 5 volts, the maximum variation in this amplitude with modulation being 6 volts peak-to-peak. With these pulses the mean output power from the demodulator which is available for application to a subscriber's line is approximately 4 milliwatts.

In certain circumstances it may be desirable to connect a capacitor between the diode 2 and the common junction of the inductor 4, the capacitor 5 and the base electrode of the transistor 3. These circumstances may arise where a large number of subscriber's line circuits are connected in common to the highway and there is as a result a substantial variation in potential of the terminal 1 according to the varying current conditions in the highway. This additional capacitor serves to isolate the base electrode circuit of the transistor 3 from the D.C. conditions at the terminal 1, and it is of course then necessary to provide a suitable biassing circuit for that pole of the diode 2 which is remote from the terminal 1.

Figure 7:
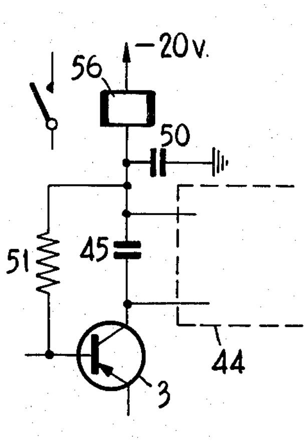
FIGURE 7 illustrates a modification of the demodulator shown in FIGURE 5.

The pulse demodulator which is described above with reference to FIGURE 5, may be modified as illustrated in FIGURE 7. In this modification a relay 56 is connected in place of the resistor 49 in the collector electrode load of the transistor 3. The relay 56 remains unoperated in the normal condition of the circuit, that is, while only negligible collector electrode current flows, but becomes operated when collector electrode current flows, as described above, in response to the reception of channel pulses.

The relay 56 remains operated for as long as pulses are being received by the demodulator, so that in this manner the dual function of demodulating the channel pulses and applying ringing or other calling signals to the subscriber's line may be achieved with one simple transistor circuit.

It will be appreciated that a relay may constitute the whole of the load 8 referred to in connection with FIGURE 1, if so desired.

We claim:

1. An electric circuit for supplying pulses comprising: a transistor having an emitter electrode, a base electrode, and a collector electrode; an inductance; a capacitance; means connecting the inductance in shunt with the capacitance and between the emitter and base electrodes of the transistor; supply means for supplying a train of unidirectional pulses which have respective durations that are short compared with intervals between those pulses; and means connecting the supply means to the emitter and base electrodes to apply said pulses between those electrodes to drive the transistor beyond cut-off; the shunt-connected inductance and capacitance being responsive to the applied pulses to store energy of each said pulse and during the interval following that pulse to discharge that energy into the transistor between the base and emitter electrodes to cause the transistor to conduct for a period which is susbtantially longer than the duration of that pulse.

2. An electric circuit according to claim 1 wherein a resistor is connected in shunt with the inductance to dampen oscillation of the shunt-connected inductance and capacitance.

3. An electric circuit according to claim 1 wherein said means connecting the supply means to the emitter and base electrodes includes a rectifier connected between the supply means and the base electrode to conduct only in response to said pulses supplied by the supply means.

4. An electric circuit according to claim 1 in combination with relay, wherein the relay is connected to the collector electrode of the transistor to be energized by collector current which flows in the transistor due to said train of pulses supplied by said supply means.

5. An electric circuit according to claim 1 in combination with rectifying means connected to the collector electrode of the transistor to derive direct current from pulses appearing at the collector electrode of the transistor.

6. A combination according to claim 5 wherein the pulses of the pulse train supplied by the supply means have the same duration and the pulse train has a constant recurrence period, and the period of discharge of the shunt-connected inductance and capacitance is substantially half said recurrence period.

7. A combination according to claim 5 wherein said discharge of the shunt-connected inductance and capacitance in the interval after each said pulse causes the transistor to become fully conducting for a period which is substantially longer than the duration of that pulse.

8. An electric circuit according to claim 1 in combination with a low-pass filter, wherein the train of pulses supplied by said supply means is an amplitude modulated pulse train, and said low-pass filter is connected to the collector electrode of the transistor to derive modulation frequency signals of that pulse train from pulses appearing at the collector electrode.

9. An electrode pulse lengthening circuit comprising: a transistor having an emitter electrode, a base electrode, and a collector electrode; biassing means to bias the transistor to cut-off; an inductance; a capacitance; means connecting the inductance in shunt with the capacitance and between the emitter and base electrodes of the transistor; a pulse gate which has an input terminal, a control terminal and an output terminal, which pulse gate is for passing unidirectional pulses applied to its input terminal to its output terminal only when a pulse is applied to the control terminal; and a rectifier connected between the output terminal of the gate and the base electrode of the transistor with the direction of forward conduction of that rectifier opposed to the direction of forward conduction within the transistor between the base and emitter electrodes; the shunt-connected inductance and capacitance being responsive to pulses applied through said rectifier to store energy of each said pulse and during the interval following that pulse to discharge that energy into the transistor between the base and emitter electrodes to cause the transistor to conduct for a period longer than the duration of that pulse.

10. A pulse detector for providing a continuous output signal for as long as a train of input pulses is applied thereto, which pulse train has a pulse recurrence period that is substantially longer than the duration of each pulse, comprising: a transistor having an emitter electrode, a base electrode, and a collector electrode; input means to apply the input pulses between the emitter and base electrodes to drive the transistor beyond cut-off; an inductance; a capacitance; means connecting the inductance in shunt with the capacitance and between the emitter and base electrodes of the transistor, the shunt-connected inductance and capacitance being responsive to the input pulses applied between the base and emitter electrodes to store energy of each input pulse and to discharge that energy into the transistor between the base and emitter electrodes after the cessation of that pulse to cause the transistor to be fully conducting for a period substantially longer than the duration of that pulse; and rectifying means connected to the collector electrode to derive direct current from pulses which appear at the collector electrode.

11. A demodulator for demodulating a train of amplitude modulated pulses comprising: a transistor having an emitter electrode, a base electrode, and a collector electrode; means for applying the train of amplitude modulated pulses between the base and emitter electrodes of the transistor to drive the transistor beyond cut-off; an inductance; a capacitance; means connecting the inductance in shunt with the capacitance and between the emitter and base electrodes of the transistor, the shunt-connected inductance and capacitance being responsive to the amplitude modulated pulses applied between the base and emitter electrodes to store energy of each such pulse and to discharge that energy into the transistor between the base and emiter electrodes after the cessation of that pulse to cause the transistor to conduct for a period substantially longer than the duration of that pulse; and a low-pass filter connected to the collector electrode of the transistor to derive modulation frequency signals of the pulse train from pulses appearing at the collector electrode.

References Cited in the file of this patent

UNITED STATES PATENTS 2,777,057 Pankove ---------------- Jan. 8, 1957